Dec. 9, 1924.

Re. 15,959

D. C. COBLE

JARRING MACHINE

Original Filed May 23, 1919 2 Sheets-Sheet 1

INVENTOR
David C. Coble
BY Davis & Davis
ATTORNEYS

Dec. 9, 1924. Re. 15,959

D .C. COBLE

JARRING MACHINE

Original Filed May 23, 1919 2 Sheets-Sheet 2

INVENTOR
David C. Coble
BY Davis & Davis
ATTORNEYS

Reissued Dec. 9, 1924. Re. 15,959

UNITED STATES PATENT OFFICE.

DAVID C. COBLE, OF ELIZABETHTOWN, PENNSYLVANIA.

JARRING MACHINE.

Original No. 1,323,677, dated December 2, 1919, Serial No. 299,107, filed May 23, 1919. Application for reissue filed November 16, 1921. Serial No. 515,739.

*To all whom it may concern:*

Be it known that I, DAVID C. COBLE, a citizen of the United States, residing at Elizabethtown, in the county of Lancaster and State of Pennsylvania, have invented new and useful Improvements in Jarring Machines, of which the following is a specification.

This invention relates to improvements in jarring machines for use in foundries for jarring molds, cores, etc., or for use in chocolate factories for jarring chocolates in molds, and the like.

One of the objects of the invention is to simplify the construction and to do away with all parts which are liable to become loose by the jarring action and to provide a machine in which only a small amount of power is required to raise the table.

Another object of the invention is to provide means for freeing the hand lever or power shaft from the mechanism when the table is dropping so as to prevent the jarring motion from being communicated to the drive shaft or the operator using the hand lever.

Still another object of the invention is to provide means whereby a number of toggle levers are used, which are connected to a single shaft, for raising the table.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which:—

Figure 1:
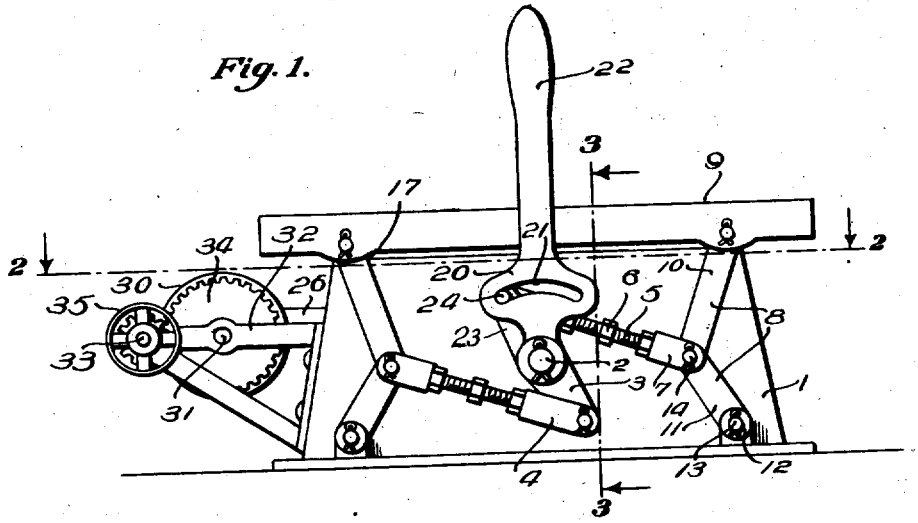
Figure 1 is an elevation of the invention.
Figure 2:
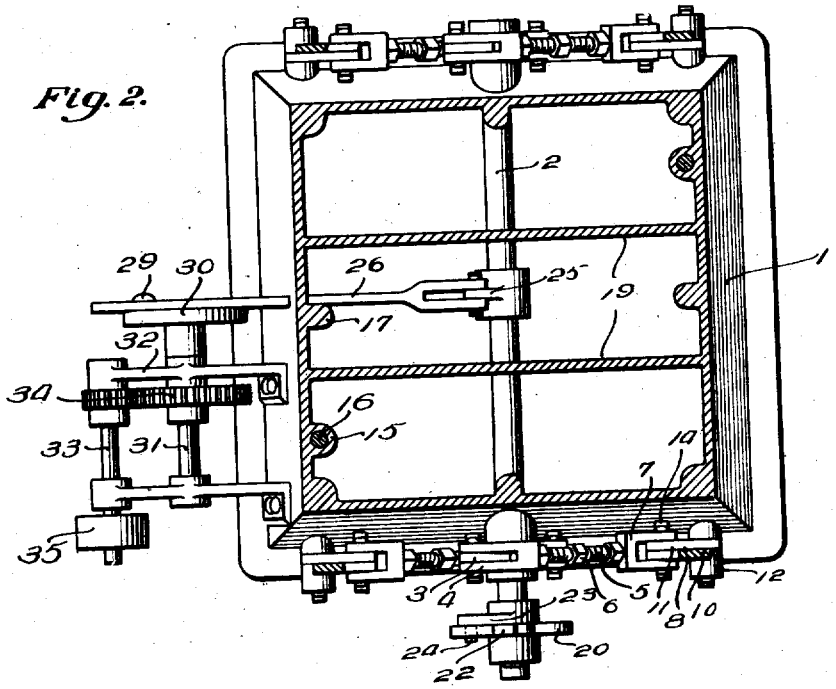
Fig. 2 is a horizontal section on line 2—2 of Fig. 1.
Figure 3:
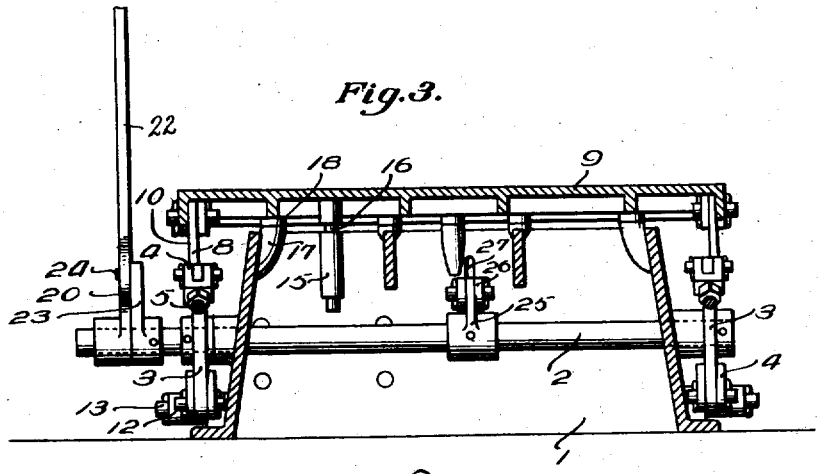
Fig. 3 is a cross section on line 3—3 of Fig. 1.
Figure 4:
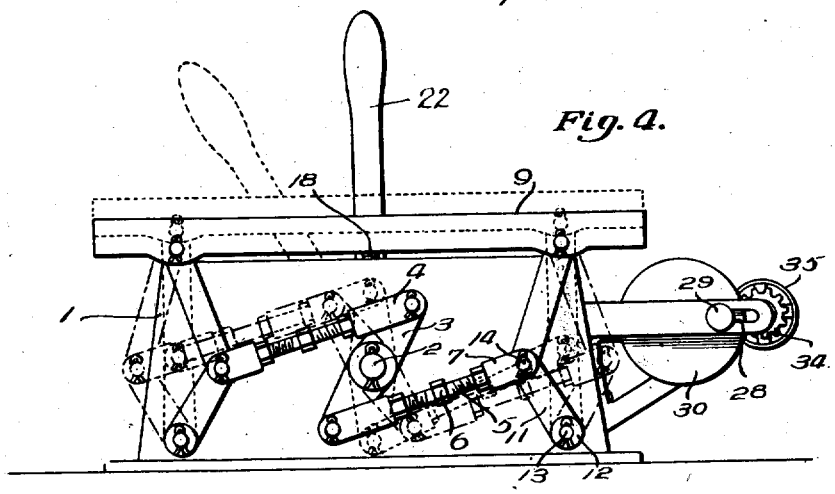
Fig. 4 is a view similar to Fig. 1, but taken from the opposite side.
Figure 5:
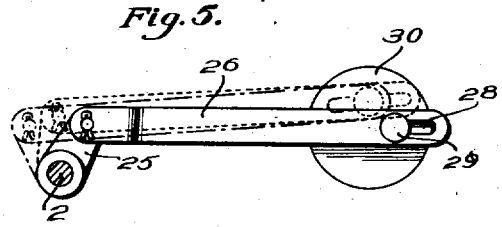
Fig. 5 is a detailed view.

In these views 1 indicates a casing of substantially rectangular form and through which passes a shaft 2. This shaft is journaled in the sides of the casing with its ends projecting therefrom. Each of the projecting ends of the shaft carries an arm 3 which is connected with the shaft midway its ends. Each end of each arm 3 is pivotally connected with a forked member 4 and the outer end of each of the forked members is provided with a screw threaded socket to receive the screw-threaded end of a rod 5. Each rod is provided with a hexagonal central part 6 and the other end of the rod is screw-threaded in a different direction from the first mentioned end. This other end of the rod engages the screw-threaded socket in a forked member 7 which is connected with the pivotal point of the toggle levers 8 which connect the top plate 9 with the casing. As will be seen, the rods 5 and their connecting members form a turn buckle construction by which the parts may be easily and quickly adjusted.

As will be seen there is a pair of toggles on each of the two sides of the casing with the upper link 10 of each set connected with a corner of the plate 9. Each of the lower links 11 is provided with a sleeve 12 which engages a pin 13 projecting from the casing. The toggles of each set and the forked member 7 are connected together by the pin 14 which is held in place by the usual cotter pins so that there is no danger of jarring the parts loose. The interior walls of the casing carry the guide members 15 with which engage the pins 16 projecting downwardly from the lower face of the plate 9. The interior walls of the casing also are provided with the upwardly projecting parts 17 which extend above the upper edges of the casing and have their tops flat and these parts are adapted to be engaged by the depending parts 18 on the bottom side of the plate 9 which are also provided with flat ends so that when the plate or table 9 drops and these flat ends come together the table and the molds carried thereby, will be jarred. I provide cross pieces 19 across the top of the casing and the top edges of these cross pieces may be provided with projections similar to those shown at 17 and these projections are engaged by similar projections on the bottom of the table.

The rock shaft 2 may be actuated by hand or by power. In order to rock the shaft by hand I provide a sector 20 on one end of said shaft which is provided with a curved slot 21. 22 is a hand lever formed on said sector.

23 is an arm connected with the shaft and carrying a pin 24 which is adapted to engage the slot 21. In this way when the pin engages the end of the slot, the sector and shaft will move with the lever so as to straighten out the toggle levers and thus lift the table or plate, and as soon as said lever passes the dead center the table will drop and the resulting shock will be prevented from being communicated to the arms of the operator by the slot 21 freeing the pin from the sector. The shaft may be driven by power by means of the following arrangement of parts. Within the casing the shaft is provided with a crank or arm 25 and a link 26 has one end pivoted to said arm. This link passes through a slot 27 in one end of the casing and the end of said link is slotted as at 28. This slot engages a crank pin 29 on a disk 30 which is connected with a shaft 31 journaled in brackets 32 secured to the end of the casing. A second shaft 33 is also journaled in said brackets and the two shafts are provided with the gears 34 which mesh with each other. The shaft 33 is provided with a pulley 35 which is adapted to receive a belt or the like for transmitting power from a motor or other suitable source of power to said shaft. If desired, the pulley may be replaced by a crank so that the shafts may be rotated by hand. By providing the link 26 with the slot 28 the shock or jar of the falling table is removed from the driving mechanism as this slot permits the link to be moved without moving the pin on the disk.

It will thus be seen that all jar and vibrations are prevented from being transmitted to the driving mechanism or to the operator and by the arrangement shown each movement of the hand lever will result in a drop of the table and every revolution of the crank disk will result in two drops of the table. The table is raised by the toggle levers at each corner thereof so that a uniform movement is secured and a fine adjustment of the parts may be secured by the arrangement of the turn buckles for each set of toggles.

It will be observed that in operation all of the toggle-levers break in the same direction simultaneously, that is, inwardly or outwardly with respect to the axis of the shaft 2. This is accomplished by the use of the arm 3 being secured to the shaft 2 intermediate its ends, as before described, thereby providing a crank-arm on opposite sides of the shaft which push simultaneously in one direction to break the toggles outwardly and pull in the opposite direction to break the toggles inwardly. By thus operating the toggles in this manner, each pair on opposite sides of the shaft 2 tends to balance or counteract the lateral thrust on the guide members 15—16, thereby avoiding undue frictional contact between said guide members and permitting the table 9 to rise and fall easily.

It will of course be understood that the hand lever is only used when the power means are disconnected from the machine, as when the machine is being operated by the power the hand lever is unnecessary.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a frame, a table thereon, toggles connecting the table with the frame, a rock shaft journaled in the frame, adjustable means for connecting the toggle levers with the shaft and means for rocking the shaft.

2. A device of the class described comprising a frame, a table supported thereon, toggle levers connecting the table with the frame, a rock shaft, turn buckles connecting the toggle levers with the shaft and means for rocking the shaft.

3. A device of the class described comprising a frame, a table supported thereon, toggle levers connecting each corner of the table with the frame, a rock shaft journaled in the frame, arms connected with the shaft intermediate their ends, turn buckles connecting the toggle levers with the ends of the arms and means for rocking the shaft.

4. A device of the class described comprising a frame, a table supported thereon, toggle levers connecting the table with the frame, a rock shaft, means for adjustably connecting the toggle levers with said shaft, a hand lever connected with the shaft by a pin and slot connection and power driven mechanism adapted to be connected with the shaft when the hand lever is not to be used, said mechanism including a shaft, a crank pin connected therewith and a link having one end connected with the rock shaft and its other end slotted and engaging the crank pin.

5. A jarring machine embodying a base, a table, means for lifting and dropping the table, means for guiding the table with respect to the base, said lifting and dropping means embodying four toggles connecting the table to the base and disposed at the corners of the table, and devices for simultaneously breaking all the toggles outwardly away from the center line of the machine and alternately breaking all the toggles inwardly toward the center line of the machine to thereby neutralize lateral thrust and thus relieve the guiding means of strains.

6. A jarring machine embodying a base, a table, means for lifting and dropping the table, means for guiding the table with respect to the base, said lifting and dropping means embodying four toggles connecting the table to the base, a rock-shaft in the base at a point between the toggles, a mechanism for operating the shaft embodying a lost-motion connection, arms on the ends of the shaft projecting in opposite directions from the axis of the shaft, and links connecting the ends of said arms to the toggles.

In testimony whereof I hereunto affix my signature this 23 day of April, 1921.

DAVID C. COBLE.